Nov. 26, 1929.  A. A. MORTENSEN  1,736,797
DASHBOARD GASOLINE INDICATOR
Filed April 14, 1924
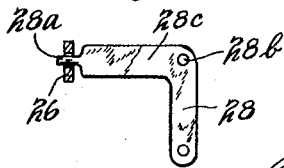
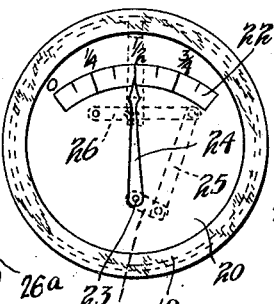
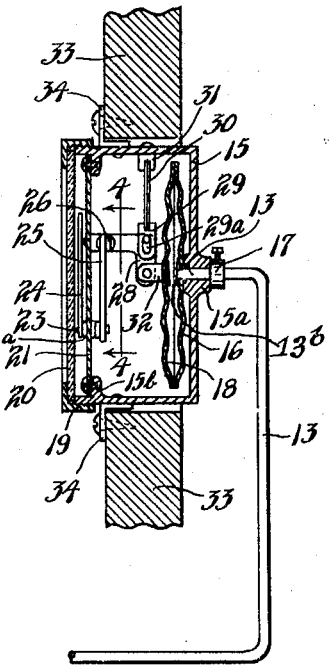
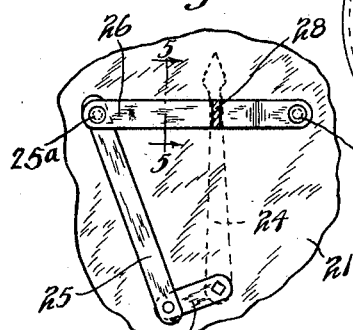
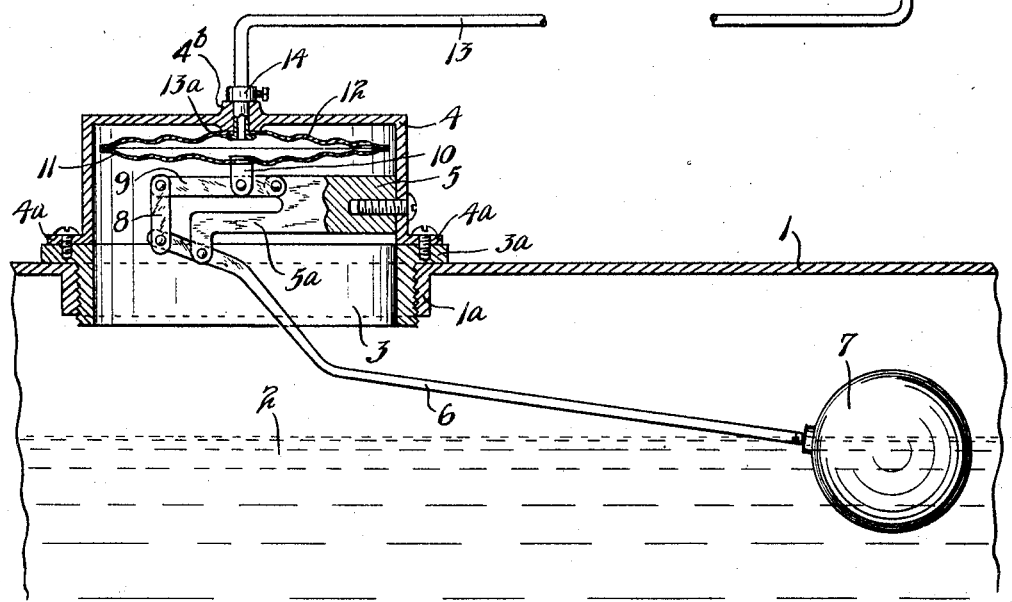
INVENTOR.
ALFRED A. MORTENSEN.
BY HIS ATTORNEY.
James F. Williamson Patented Nov. 26, 1929

1,736,797

UNITED STATES PATENT OFFICE

ALFRED AXEL MORTENSEN, OF MINNEAPOLIS, MINNESOTA

DASHBOARD GASOLINE INDICATOR

Application filed April 14, 1924. Serial No. 706,343.

This invention relates to a gauge or indicating device and while the invention is applicable to various uses, it is particularly adapted for use in connection with an indicator indicating the level of liquid in a tank. The invention has been found to have great utility when used in connection with the gasoline tank of an automobile.

It is an object of the invention to provide a simple and efficient mechanism comprising an indicator which may be located so as to be conveniently visible to the driver of an automobile, which indicator will indicate the supply of gasoline or other liquid in the supply tank.

It is a further object of the invention to provide such a device including an indicator, together with means applied to the liquid in the tank to operate the indicator, said means including a float operated diaphragm.

It is more specifically an object of the invention to provide a gauging and indicating device comprising a conveniently located indicator, a chamber having a diaphragm wall, a lever mechanism operating from movement of said wall to operate said indicator, and a float-controlled means including a fluid conduit connected to said chamber for operating said diaphragm wall.

These and other objects and advantages of the invention will be fully set forth in the following description made in connection with the accompanying drawings in which like reference characters refer to the same parts throughout the different views, and in which, Fig. 1 is a view in vertical central section through a gasoline tank and a portion of the device secured thereto;

Fig. 2 is a vertical central section through a portion of the device attached to the dash board or instrument board of the automobile;

Fig. 3 is a view in front elevation of the dial as seen from the left of Fig. 2;

Fig. 4 is a view in vertical section on the line 4—4 of Fig. 2, as indicated by the arrows; and Fig. 5 is a view in vertical section taken on the line 5—5 of Fig. 4, as indicated by the arrows, Figs. 4 and 5 being shown on an enlarged scale.

Referring to the drawings, a portion of a liquid containing tank having a top wall 1 is shown containing the liquid 2 and said wall is shown as having a downwardly extending cylindrical flange 1$^a$ in which is tightly threaded a cylindrical casing 3 having a flange 3$^a$ extending over the top 1. A cylindrical cap or casing 4 having an open lower end surmounts the member 3 and has a flange 4$^a$ secured to the flange 3$^a$ thereof by suitably spaced headed screws, the internal diameter of members 3 and 4 being substantially the same. A bracket 5 is secured to the inner wall of the member 4 by any suitable means, such as the headed screw shown, which bracket has a lower downwardly extending arm 5$^a$ forming the fulcrum support of a float lever 6 pivoted to the lower end of said arm. The lever 6 is of considerable length and carries at its free end the float 7 shown as in the form of a ball. The other end of lever 6 is pivoted to one end of a link 8, which, in turn, is pivoted at its other end to one end of a lever 9, the other end of lever 9 being pivoted to a lug at the upper side of bracket 5. The lever 9 has pivoted thereto intermediate its ends an arm 10, the other end of which is tightly secured to a diaphragm 11. Said diaphragm may be of any desired shape but, in the embodiment of the invention illustrated, is shown as of circular shape. The diaphragm 11 has a second diaphragm 12 secured thereto adjacent its periphery so that an air or fluid chamber is formed between said diaphragms. The casing 4 is formed with a central boss 4$^b$ at its top through which extends the end of a conduit 13, said conduit having a flanged end 13$^a$ engaging the inner side of diaphragm 12 and clamping the same against the hub of casing 4. Said conduit 13 conveniently is held in place by collar 14 secured thereto by a suitable set screw. The conduit 13 is extended to another casing 15 illustrated as of cylindrical shape having a central boss 15$^a$ through which the conduit 13 extends, said conduit having a flanged end 13$^b$ clamping the diaphragm 16 against the hub 15$^a$. Said conduit is also held in place relative to casing 15 by a collar 17 secured thereto by a suitable set screw. The diaphragm 16 has another diaphragm 18 of similar shape secured thereto at its periphery thus forming an air or fluid chamber between the diaphragms 16 and 18. The casing 15 has an open end and is externally threaded adjacent said end to receive a flanged cap 19 adapted to be screwed thereon, said cap having a large central opening therein and clamping a transparent plate 20 against the open end of casing 15. A dial 21 is secured to lugs 15ᵇ in the casing 15 by suitable screws and is spaced a short distance rearwardly of the plate 20. The dial 21 will carry some suitable graduation which, in the embodiment of the invention illustrated is shown as an arcuate scale 22 having radial graduation marks thereon designated respectively by the numerals "0", "1/4", "1/2" and "3/4". The dial 21 carries a hub or boss 21ᵃ below the central portion thereof in which is journaled an axle pin 23, to the outer side of which is secured a hand or pointer 24 adapted to co-operate with the scale 22. Said axle pin 23 has an angular shaped inner end to which is rigidly secured a link 24ᵃ extending laterally therefrom, the other end of said link 24ᵃ being pivotally secured by a pivot 25ᵃ to a link 25 which in turn extends upwardly in an inclined direction and has its upper end pivotally secured to a lever 26. The lever 26 normally extends substantially horizontally and transversely of hand 24 being pivotally connected at one end to dial 21 by pivot 26ᵃ and it will be seen from Fig. 2 and Fig. 3 that the members 24ᵃ, 25 and 26 are disposed in the rear of the dial 21. The lever 26 is apertured intermediate its ends to receive loosely the pin-like end 28ᵃ of one arm 28ᶜ of a bell crank lever 28. The lever 28 has projecting at each side thereof a fulcrum pin 28ᵇ and the pins 28ᵇ are disposed respectively in slots 29ᵃ extended longitudinally of the sides of a yoke 29 which yoke extends upwardly from the lever 28 and is rigidly secured to the lower end of a thermostat bar 30 which as illustrated in Fig. 2 may be of the bi-metallic bar type, the upper end of which thermostat is secured in a block 31 suitably secured to the top of casing 15. The bell crank lever 28 has a downwardly extending arm pivotally secured adjacent its lower end to an arm 32, the other end of which arm is tightly fastened centrally in the diaphragm 18. The casing 15 is conveniently secured to a support 33 which may be the dash board or the instrument board of the automobile by brackets 34, said brackets being riveted, or otherwise secured to the casing 15 and secured to the board 33 by suitable headed screws.

In operation, it will be seen that if the level of the liquid 2 is lowered, float 7 will drop with said liquid. This will swing upwardly the short end of lever 6 and through the link 8, will raise the lever 9. This will raise the diaphragm 11 so that the chamber between said diaphragm and diaphragm 12 will be contracted. Air or other fluid is contained in the chamber between the diaphragms 11 and 12 and 16 and 18 and in the conduit 13. This air or fluid will thus be moved upwardly through the conduit 13 and the same discharged into the chamber between diaphragms 16 and 18. Diaphragm wall 18 will therefore be moved outwardly and bell crank 28 will be moved so that its upper or substantially horizontal arm is lifted. This will lift the lever 26 and said lever 26 will raise link 25 and the outer end of link 24ᵃ so that the hand or pointer 24 will be swung to the left, as seen in Fig. 3. The pointer 24 is so set that when the tank containing the liquid 2 is empty it will aline with zero graduation and when the tank is full it will aline with the right hand end of scale 22. As the level of liquid drops, therefore, it will be seen that the hand or pointer 24 will be moved to the left and will indicate that the tank is three-fourths full or one-half full, or otherwise, according to conditions. It will also be seen that if liquid is placed in the tank, the float 7 will be raised and the lever 6 will move diaphragm 11 downwardly, thus enlarging the chamber between diaphragms 11 and 12 and causing fluid to flow downwardly through the conduit 13. This will draw the fluid from the chamber between diaphragms 16 and 18 and the diaphragm 18 will be moved to the right, as seen in Fig. 2, by the normal pressure of the air. This movement through the lever mechanism connecting diaphragm 18 and the pointer 24 will move the pointer to the right, as seen in Fig. 3.

It will be apparent that if the temperature rises, as in very warm weather, that the fluid or air in the diaphragm chambers and conduit 13 will expand. Such expansion would move the diaphragm wall 18 and cause a movement of pointer 24 to the left by raising the horizontal arm of bell crank lever 28. This would be an inaccurate registration of the hand 24 and in order to compensate for this inaccuracy which might thus occur, the thermostat bar 30 is used. As the temperature rises the bar 30 is arranged to bend so that its lower end moves to the left, as seen in Fig. 2. It will be seen that this movement will, through the member 29 and the loose pivotal joint formed by the slots 29ᵃ and the pins 28ᵇ, swing the horizontal arm of bell crank lever 28 downwardly. This will compensate for any movement of said bell crank lever by the diaphragm 18 so that the pointer 24 will not be moved. The thermostat bar 30 therefore compensates for any tendency of the instrument to register inaccurately due to changes in temperature.

From the above description it is seen that applicant has provided a simple, accurate and efficient liquid indicator and one that has great utility when used in connection with the gasoline tank of a motor vehicle. As is commonly known, such tanks are usually located at the rear of the vehicle or under the seat and it is quite inconvenient to examine the tank whenever it is desired to know how great the supply of liquid is. In applicant's invention the amount of liquid in the tank is at all times accurately indicated and the indicator is clearly visible to the operator. It will be noted that the diaphragm chambers and the conduit 13 are hermetically sealed. There is therefore no chance of any of the liquid in the tank entering said parts. The said chambers and conduit are therefore kept in perfect condition whether there is liquid in the tank or not. The device is simple, easily installed, accurate in operation and needs no attention when once adjusted.

It will, of course, be understood, that various changes may be made in the form, details, arrangement and proportions of the parts without departing from the scope of applicant's invention, which, generally stated, consists in a device such as shown and described and defined in the appended claims.

What is claimed is:

1. A liquid level indicating device having in combination a substantially vertically disposed dial, a pivot supported therein, a hand carried on said pivot and movable over said dial, a lever pivoted at one end to said dial above and at one side of said pivot and extending substantially horizontally, a link mechanism connected to the other end of said lever and to said first mentioned pivot, a bell crank lever pivoted about a suitably supported horizontal axis and having a substantially horizontal arm loosely connected to said first mentioned lever intermediate the ends thereof, and a diaphragm pivotally connected to the other arm of the said bell crank lever.

2. A liquid level indicator comprising a float, a closed member having a diaphragm wall and forming a fluid chamber therein, means for moving said diaphragm wall as said float is moved, a fluid conduit connected at one end to said member and communicating with the chamber formed therein, a second closed member having a diaphragm wall and forming a fluid chamber therein, said fluid conduit being connected at its other end to said second member and communicating with the chamber formed therein, a dial, a pointer pivoted in said dial for movement thereover, a bell crank lever having an arm pivotally connected to said last mentioned diaphragm wall, a lever mechanism connecting the other end of said bell crank lever to said pointer and a member responsive to changes in temperature and forming a fulcrum support for said bell crank lever, said last mentioned member being adapted to shift the fulcrum point of said bell crank lever to compensate for the variable movement of said last mentioned diaphragm wall due to variations in temperature.

3. A liquid level indicator, comprising a closed member having a diaphragm wall and forming a fluid chamber therein, a float, means adapted to be operated by said float to control the movement of said diaphragm wall, a conduit having one end secured to said member and communicating with said chamber, a second closed member having a diaphragm wall and forming a fluid chamber therein, said conduit being connected at its other end to said second member and communicating with the chamber formed therein, said chambers and conduit forming an air tight system, a bell crank lever having a substantially horizontal and substantially vertical arm, said vertical arm being pivotally connected to said last mentioned diaphragm wall, a lever extending substantially at right angles to the horizontal arm of said bell crank lever and pivotally connected thereto, a dial, a pointer for said dial and means for connecting said last mentioned lever to said pointer.

4. A liquid level indicating device having in combination a vertically disposed dial, a pivot supported therein, a hand carried on said pivot and movable over said dial, a lever pivoted at one end to said dial above and at one side of said pivot and extending substantially horizontally, a link mechanism connected to the other end of said lever and to said first mentioned pivot, a bell crank lever having a substantially horizontal arm loosely connected to said lever intermediate the ends thereof, a diaphragm operated member connected to the other arm of said bell crank lever, a horizontal pivot upon which said bell crank lever is pivoted and projecting at each side of said bell crank lever and carried thereby, a member having a vertically disposed slot therein through which said horizontal pivot extends, a bar fixed at one end and constituting means responsive to changes in temperature, said bar being connected to said member and adapted to move said horizontal pivot laterally and swing said bell crank lever and means for supporting said bar.

5. A liquid level indicator for automobiles having in combination, a tank adapted to contain liquid, a casing secured to the top of said tank and projecting thereabove and having an open side communicating with said tank, a bracket secured to the interior of said casing, a substantially flat casing in said first mentioned casing having opposed flexible horizontal diaphragm walls to form a chamber, a rigid arm positively connected to the lower wall of said second mentioned casing, a lever having a float at one end connected adjacent its other end to said bracket, a lever mechanism connecting the latter end of said lever to said arm, the upper diaphragm wall of said second mentioned casing being rigidly secured at its central portion to the top of said first mentioned casing, said second mentioned casing containing air, an air conduit extending centrally into said casings and communicating with the interior of said second mentioned casing, a pressure responsive indicator at the other end of said air conduit operated by the movement of air therein, said bracket having a downwardly directed arm to which said float carrying lever is secured and said lever mechanism including a lever of the second class pivotally connected at one end to said bracket and connected at the other end by a link to the adjacent end of said float carrying lever and directly conected intermediate its ends to said first mentioned arm.

In testimony whereof I affix my signature.

ALFRED AXEL MORTENSEN.